United States Patent Office 3,058,359
Patented Oct. 16, 1962

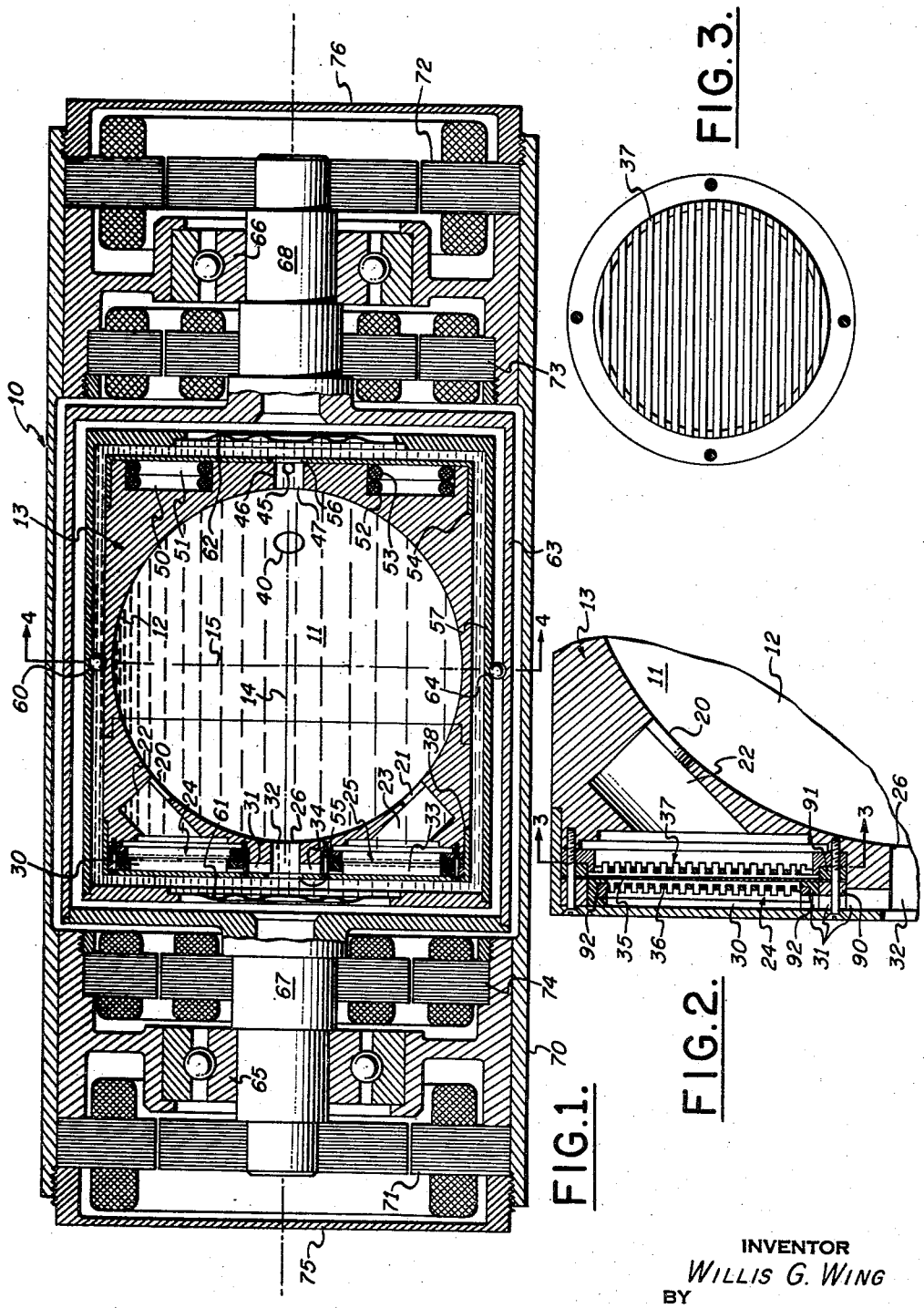

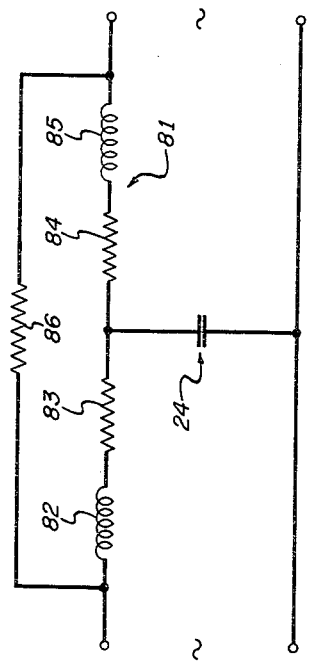
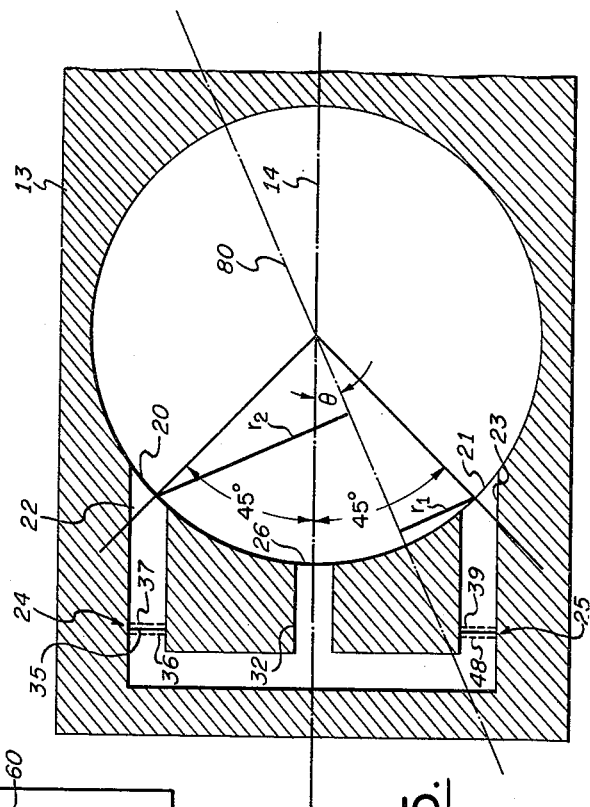

3,058,359
FLUID ROTOR GYROSCOPIC APPARATUS
Willis G. Wing, Glen Head, N.Y., assignor to Sperry Rand Corporation, Great Neck, N.Y., a corporation of Delaware
Filed Jan. 21, 1960, Ser. No. 3,957
19 Claims. (Cl. 74—5.6)

This invention relates to gyroscopic apparatus and particularly to gyroscopic apparatus utilizing a fluid as the rotor of the gyroscope.

In the preferred embodiment of the present invention, the gyroscopic rotor is a mass of fluid contained in a spherical cavity in a housing. The cavity housing is rotated and induces a corresponding rotation or spin to the fluid body. Under these conditions, the fluid body tends to maintain a fixed orientation in space despite changes in the orientation of the cavity housing causing the spin axis of the fluid to deviate from the spin axis of the cavity housing. Actually, the fluid body is subjected to viscous shear torques and as a result tends to precess into alignment with the cavity housing, i.e., the spin axis of the fluid tends to come into alignment with the spin axis of the housing over a period of time. Thus, a gyroscope of this type is in reality a rate gyroscope having a long time delay although it may also be considered a displacement gyroscope having a poor memory. The dynamic response of the gyroscope can be adapted to provide rate or displacement information by utilizing a suitable servo system.

The advantages of a gyroscope of this type include (1) the fluid body is inherently in perfect balance since the center of support of the fluid is always at its center of gravity if the temperature of the fluid is uniform, thus, eliminating mass shift errors which are a primary cause of inaccuracy in conventional gyroscopes, (2) zero coulomb friction, (3) the gyroscopic rotor support bearings are external to the cavity and mass shifts caused by bearing changes are thus relatively unimportant, (4) the rotor drive motor is external to the cavity and power is easily introduced to the motor without coercing the sensitive gyroscopic rotor element as in conventional gyroscopes, (5) small variations in cavity shape do not cause drift, (6) manufacture is simple, inexpensive and does not require maintaining close machining tolerances or dust-free manufacturing environment, (7) it lends itself to compact and symmetrical structural and thermal design thereby minimizing temperature gradient unbalance which results in gyroscopic drift in conventional gyroscopic apparatus, (8) it requires only a short warm up time to provide full accuracy, (9) low anisoelastic drift since there is very little compliance unbalance, (10) since there are no moving parts except the fluid containing cavity and since dirt and microcontamination are relatively unimportant to the performance, the unit is highly reliable, (11) it inherently provides information about two orthogonal axes, and (12) it lends itself to the use of inductive slip rings thereby eliminating electrical lead coercion and slip-ring noise.

It is a primary object of the present invention to provide an extremely accurate gyroscopic apparatus having minimum random drift.

It is an additional object of the present invention to provide a gyroscopic apparatus having zero mass unbalance of the sensitive element.

It is a further object of the present invention to provide a gyroscopic apparatus capable of measuring minute movements that is compact, rugged and relatively inexpensive.

The above objects are achieved in the present invention by utilizing a fluid rotor in a gyroscopic apparatus. The fluid is contained in a rotating spherical cavity and in the absence of external rotation of the apparatus, the spin axis of the fluid is coincident wtih the spin axis of the cavity. In the presence of an external rotation, the fluid spin axis deviates from the cavity spin axis at a rate proportional to the rate of angular movement. Actually, the fluid rotor tends to remain fixed in space due to its gyroscope rigidity while the cavity housing moves with respect to it. The variations in fluid pressure within the cavity due to the above are sensed, in the preferred embodiment shown, by two pressure responsive pick-offs about each sensitive axis. The pick-offs communicate with respective ports in the spherical cavity that are displaced 45° on each side of the cavity spin axis. The pick-offs provide zero output when the spin axes of the fluid and the cavity are aligned and provide a signal representative of the angular difference between the spin axes when they are not aligned in accordance with the change in differential pressure. The amplitude of this signal is proportional to the rate of rotation of the gyroscopic device and its phase is indicative of the space direction of the applied rotation vector.

The present invention will now be described with reference to the drawings in which:

FIG. 1 is a sectional view of a preferred embodiment of the present invention taken along the longitudinal axis of the apparatus;

FIG. 2 is an enlarged sectional view showing the capacitive pick-off of FIG. 1;

FIG. 3 is a front view of the permeable capacitive plate of the pick-off of FIG. 2 taken along lines 3—3;

FIG. 4 is a cross-sectional view of FIG. 1 taken along lines 4—4;

FIG. 5 is a diagrammatic representation of the embodiment of FIG. 1 showing the spin axis of the fluid tilted at an angle $\theta$ with respect to the spin axis of the cavity;

FIG. 6 is a wiring schematic of a tuned circuit; and

Figure 7:
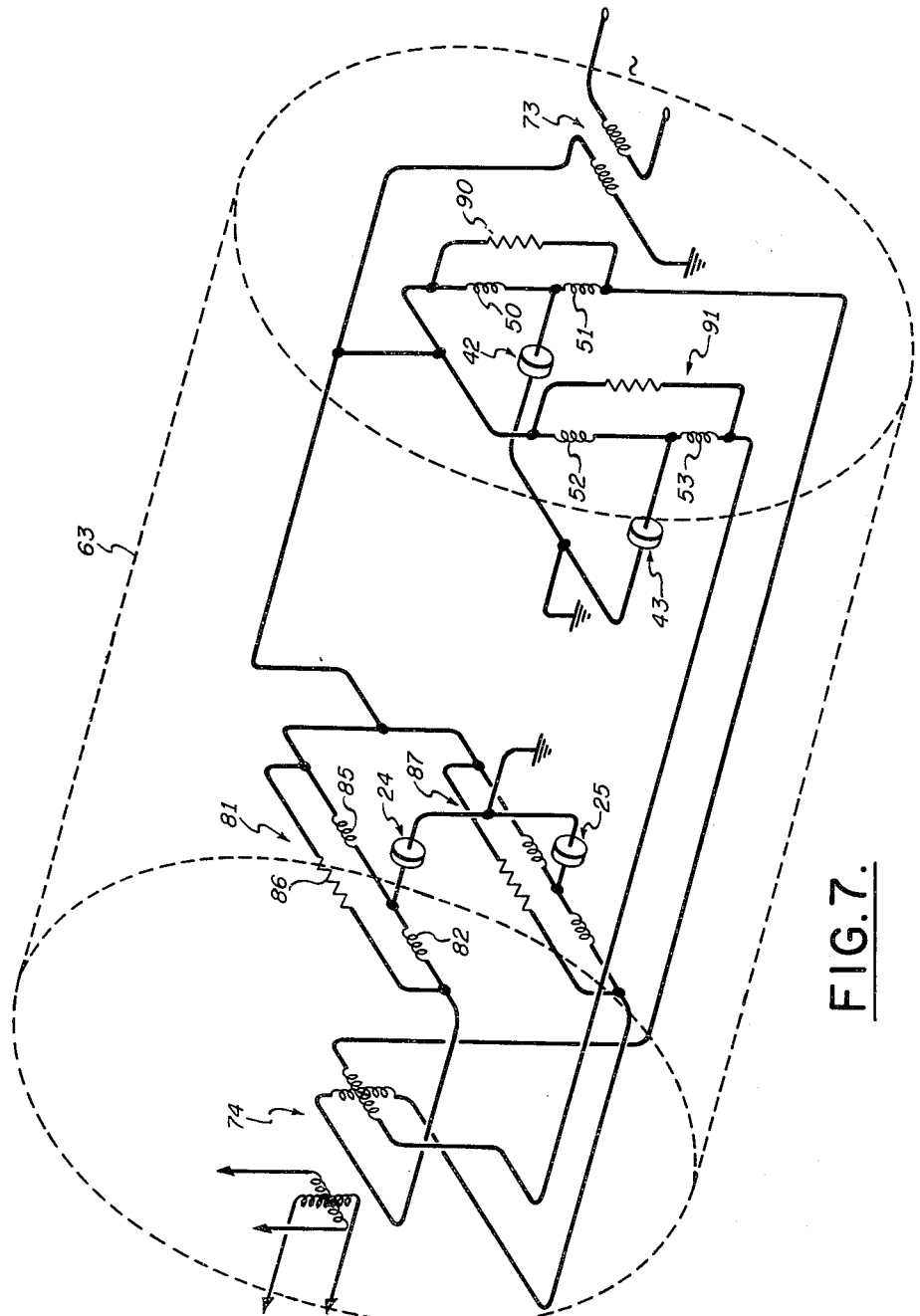
FIG. 7 is a wiring schematic of the circuit of FIG. 1 in perspective.

Referring to FIG. 1, the present invention will be described with reference to a gyroscopic apparatus 10 utilizing a fluid rotor 11. The gyroscope 10 of the preferred embodiment shown is capable of providing signals representative of the rate of turn experienced by the gyroscope about two sensitive axes in a manner to be described.

The rotor 11 of gyroscope 10 is a fluid sphere contained within and defined by a spherical cavity 12 in a cylindrical rotor or cavity housing 13. In the preferred embodiment shown, the gyroscope 10 is structurally and thermally symmetrical with respect to its longitudinal axis 14 and with respect to its central plane that is normal to the longitudinal axis 14 and contains the vertical axis 15 in a manner to be described. In the embodiment shown, the spin axis of the rotor housing 13 coincides with the longitudinal axis 14. For ease of manufacture, the rotor housing 13 may be composed of two pieces that are welded or held together by other conventional means to form an integral member.

A pair of ports 20 and 21 in the spherical cavity 12 are equally displaced on opposite sides of the spin axis 14, preferably at an angle of 45°, in the plane defined by the spin axis 14 and the normally vertical axis 15. The ports 20 and 21 communicate by means of conduits 22 and 23 with one side of pressure responsive capacitive pick-offs 24 and 25, respectively. The conduits 22 and 23 and the pick-offs 24 and 25 are symmetrically disposed on either side of the spin axis 14. A port 26 in the spherical cavity 12 is disposed coaxially with the spin axis 14 and communicates with the other side of the pick-off 24 by means of passages 30, 31 and conduit 32 and the other side of the pick-off 25 by means of passages 33, 34 and conduit 32. Thus, both sides of each of the pick-offs 24 and 25 communicate with the interior of the spherical cavity 12.

Details of the capacitive pick-offs are shown in FIGS. 2 and 3. One plate of the pick-off 24 consists of a resilient diaphragm 35. The other plate of the pick-off 24 is a permeable stator member 36 that is slotted to permit fluid to flow from between the plates 35 and 36, as indicated by the arrows as the diaphragm 35 moves in response to pressure variations. The plate 36 may be made by milling alternate grooves on both sides of a disc in order to provide openings between the grooves which permits fluid flow while providing sufficient surface cooperative with the diaphragm 35 to act as a condenser plate of the capacitive pick-off 24. The pick-off 24 may be connected into a circuit as shown with respect to FIG. 6, which will be described later. Variations in pressure cause movement of the diaphragm 35 thereby varying the capacitance of the pick-off 24.

The plate 36 also acts as a restraining member to prevent rupture of the diaphragm 35 in the event the diaphragm 35 is inadvertently subjected to excessive pressures. To prevent rupture of the diaphragm 35 when it is deflected in the opposite direction, a member 37 that is structurally similar to the member 36 is mounted on the opposite side of the diaphragm 35 with respect to the member 36. In the embodiment shown, the member 37 acts as a safety device and it is not electrically connected into the circuit of FIG. 6.

The pick-off 24 is assembled as a unit and secured to the housing 13 by means of a press fit and screws. The diaphragm 35 is electrically connected to the housing 13 by means of its supporting rings 90 and 91 while the plate 36 is electrically insulated from the surrounding elements by an epoxy resin insulating material 92. In this embodiment, the safety member 37 is electrically connected to the diaphragm 35 and hence to the housing 13. In alternative embodiments, the member 37 could be used as a second stator plate thus increasing the sensitivity of the pick-off 24 in which case the member 37 would be connected as described above with respect to the member 36.

Referring again to FIG. 1, a circular rotor housing cap 38 is brazed or otherwise connected to the housing 13 to secure the pick-offs 24 and 25 to the housing 13. The cap 38 also secures to the housing 13 inductive coils that are electrically connected to pick-offs 24 and 25 but cannot be seen in FIG. 1 because they are in space quadrature therewith.

Referring now to FIGS. 1 and 4, at the opposite end of the housing 13 a second pair of ports 40 and 41 are provided in the spherical cavity 12 in space quadrature with respect to the ports 20 and 21 and equally displaced, preferably at an angle of 45°, on either side of the spin axis 14 in a plane that is normal to the paper with respect to FIG. 1 and contains the spin axis 14. In a manner similar to that described above, the ports 40 and 41 communicate by means of apertures or conduits to one side of a second pair of capacitive pick-offs 42 and 43, respectively. Similarly, the other side of the capacitive pick-offs 42 and 43 connect to the interior of the spherical cavity 12 at the spin axis 14 by means of suitable passages 44 and 45, respectively, conduit 46 and port 47. The inductive coils 50 and 51 associated with the pick-off 42 and the inductive coils 52 and 53 associated with pick-off 43 can be clearly seen in FIG. 1 and as shown in FIG. 4 they are in space quadrature with respect to the pick-offs 42 and 43 to provide structural symmetry. A circular rotor housing cap 54 secures the pick-offs 42 and 43 and the coils 50, 51, 52 and 53 to the housing 13. Each of the caps 38 and 54 having a central opening 55 and 56 that are cooperative with conduits 32 and 46, respectively, to permit fluid flow therethrough.

The rotor housing 13 is mounted in spaced relation within a hollow cylindrical inner housing 57. The rotor housing 13 is supported in the inner housing 57 by means of symmetrically disposed balls 60 which may be spaced, for example, 120° apart. The space between the rotor housing 13 and the inner housing 57 is filled with the rotor fluid for floating the housing 13. To provide for expansion and contraction of the rotor fluid with variation of temperature, diaphragms 61 and 62 are disposed in the end walls of the inner housing 57. The longitudinal axis of the inner housing 57 is concentric with the axis 14 and the housing 57 spins about the axis 14.

The inner housing 57, in turn, is mounted in spaced relation within a hollow cylindrical intermediate housing 63 by means of balls 64 which are preferably spaced 120° apart intermediate the balls 60. The balls 60 provide a central support which eliminates the transmission of strains in the housing 57 to the rotor housing 13. The balls 60 and 64 provide a central thermal path to eliminate thermal gradients.

The longitudinal axis of the intermediate housing 63 is concentric with the axis 14 and spins about said axis. Both the inner and intermediate housings 57 and 63 respectively may be composed of two elements, one element being manufactured by spinning and the other element being a circular plate that is secured to the open end of the respective housing. The space between the inner housing 57 and the intermediate housing 63 is filled with a temperature gradient attenuating fluid such as air.

The intermediate housing 63 is journalled in spaced ball bearings 65 and 66 by means of shafts 67 and 68, respectively, which extend coaxially with the axis 14 from opposite sides of the housing 63 in order to spin it about the axis 14. The bearings 65 and 66 are mounted on an outer housing 70 which forms the enclosure for the gyroscopic apparatus 10. The intermediate housing 63 and all the elements therein are driven by means of two symmetrically disposed spaced motors 71 and 72. The stator of the motor 71 is mounted on the outer housing 70 while its armature is mounted on an outer extremity of the shaft 67. Similarly, the stator of motor 72 is mounted on the housing 70 while its armature is connected to an outer extremity of the shaft 68. The motors 71 and 72 are mounted at the extremities of the gyroscope since they produce the greatest amount of heat and in this position the heat is readily dissipated. For purposes of structural and thermal symmetry, they are disposed equidistant from the center of the gyroscope 10.

A magnetic or inductive slip ring 73 has its stator mounted on the outer housing 70 while its rotor is connected to an inner portion of the shaft 68. The magnetic slip ring 73 may be of the type disclosed in U.S. Patent No. 2,432,982, issued December 23, 1947 to F. D. Braddon et al. entitled Inductive Coupling.

Symmetrically disposed on the opposite side of the center of the gyroscope 10, with respect to the magnetic slip 73, is a synchro resolver 74 having its stator mounted on the outer housing 70 and its rotor connected to the shaft 67. The slip ring 73 and the resolver 74 are structurally and thermally symmetrical with respect to each other. Since they produce considerably less heat than the motors 71 and 72, they are mounted nearer to the center of the gyroscope 10. Circular end caps 75 and 76 seal the ends of the housing 70 and secure the motors 71 and 72 respectively to the housing 70. The electrical connections between the elements have not been shown in FIG. 1 for purposes of simplicity.

The operation of the gyroscopic apparatus of the present invention will now be described with reference to FIGS. 1 and 5. The sensitive element of the present apparatus 10 is the body of fluid contained within the spherical cavity 12 due to the angular momentum associated with the fluid body when the cavity 12 is rotated. In the absence of angular rates about axes normal to the cavity axis of rotation 14, viscous effects will cause the body of fluid to rotate about this same axis and at the same angular speed as the rotor housing 13. This produces a pressure distribution on the inside of the spherical cavity 12 which is symmetrical with respect to its axis of rotation 14.

When an angular rate is imposed on the gyroscope 10 about an axis normal to the cavity axis of rotation 14, the momentum of the fluid causes a force which misaligns the spin axis 80 of the fluid with respect to the spin axis of the cavity 14 as shown in FIG. 5. This force is opposed by the previously noted viscous effects so that in the steady state a constant angular difference in the cavity spin axis 14 and the fluid spin axis 80 exists as a result of such a constant angular rate input. This angular difference in the axes of rotation produces a pressure distribution on the inside surface of the spherical cavity which is no longer symmetrical with respect to the cavity axis of rotation 14.

Explained mathematically, the centrifugally induced pressure P in a rotating fluid is equal to $$P = \frac{\rho \omega^2 r^2}{2} \quad (1)$$

where:

$\rho$ is the density of the fluid,
$\omega$ is its rate of rotation in radians per second,
$r$ is the radius of measurement, as shown in FIG. 5. With the ports 20 and 21 symmetrically disposed 45° from the cavity axis of rotation 14 as described and the spin axis 80 of the fluid coincident with the cavity spin axis 14, the sum of the differential pressures across the pick-offs 24 and 25 is zero since the pressure on both sides of their respective diaphragms 35 and 39 is equal to $$P = \frac{\rho \omega^2 (R \sin \pi/4)^2}{2} \quad (2)$$

where:

R is the radius of the spherical cavity.

However, with the fluid axis 80 displaced from the cavity axis 14 by an angle $\theta$, the pressure on each of the diaphragms 35 and 39 from the fluid in the compensating conduit 32 is unchanged and is given by Equation 2. From the simplified drawing of FIG. 5, it will be seen that if the fluid body is spinning about an axis 80 as shown, which is different from the cavity spin axis 14, the port 21 is at a smaller radius $r_1$, with respect to the fluid spin axis 80 than the port 20 which is at a larger radius $r_2$. Since centrifugally produced pressure increases with radius, the pressure at the port 20 is greater than that at port 21. The pressure acting on the diaphragms 35 and 39 is the difference between the pressure at the port 26 and that at the ports 20 and 21, respectively.

One-half revolution later, the ports 20 and 21 have reversed their relative position and the pressure at port 21 is then higher than that at port 20. The differential pressure between the ports 20 and 21 thus varies periodically and essentially sinusoidally at the spin frequency. Thus, to detect the relative displacement between the spin axis of the fluid 80 and the spin axis of cavity 14, it is necessary only to detect the periodically varying differential pressure between the ports 20 and 21 by means of the pressure responsive pick-offs 24 and 25. Because the total centrifugally induced pressure may be several hundred pounds per square inch, detectable pressure differentials result from only a minute difference in the relative radii and hence for very minute angles thus providing an extremely sensitive and accurate gyroscopic apparatus.

With the diaphragms 35 and 39 excited by a reference voltage source and made the moving plates of their respective capacitors 24 and 25 and with the hydraulic passages appropriately designed to allow fluid to flow as a result of this differential pressure as explained above, a voltage will appear at the respective fixed capacitor plates 36 and 48 which also varies sinusoidally in response to the pressure variations. The electrical difference between these two voltages will be twice as large as either alone because of the 180° time phase separation and will alternate at the spin frequency, $\omega$.

The power output of each of the capacitive pick-offs may be increased by connecting each of them in a tuned bridged T circuit 81 as shown in FIG. 6 and exciting the circuit 81 by a reference source having a suitable frequency. In addition to a capacitive pick-off, for example, pick-off 24, the circuit 81 consists of series connected inductor 82, resistor 83, resistor 84 and inductor 85 with a resistor 86 connected in shunt bridging the series connected elements 82, 83, 84 and 85. The values of the element are so chosen that the circuit 81 produces no output when the spin axes 14 and 80 are aligned. Preferably, the circuit 81 is sharply tuned to provide a null output when the spin axes 14 and 80 are aligned and an appreciable output otherwise. With the capacitance of the pick-off 24 just sufficient to provide the above conditions when the spin axes 14 and 80 are aligned, small deviations in the capacitance caused by misalignment of the spin axes 14 and 80 will detune the network effectively producing an output from the circuit 81 equal to $$\frac{Q}{2}$$

times the amplitude of the pick-off signal, where Q is the quality factor of the circuit 81.

By connecting the associated capacitive pick-off 25 in a similarly tuned bridge T circuit 87 as shown in FIG. 7 and differentially connecting the outputs of the circuits 81 and 87, an electrical signal is obtained that is a suppressed carrier modulated at the spin frequency. The amplitude of the modulation is a measure of the angle $\theta$ and its phase is a measure of the axis about which the angle $\theta$ is measured. The outputs of the circuits 81 and 87 are connected to one of the quadrature rotor windings of the resolver 74.

The other pair of pick-offs 42 and 43 are connected in similarly tuned bridge T circuits 90 and 91, respectively, and the outputs of the circuits 90 and 91 are connected to the other quadrature rotor winding of the resolver 74. Thus, the two time quadrature signals from the space quadrature pairs of pick-offs, i.e. pick-offs 24 and 25, with respect to pick-offs 42 and 43, are applied to the space quadrature windings of the rotor of the resolver 74. Thus, the outputs from the stator windings of the resolver 74 no longer have the spin frequency modulation but are constant in amplitude and proportional to the angle $\theta$ about each sensitive axis of the gyroscopic apparatus 10.

Continuing to refer to FIG. 7, it will be understood that the resistances of the resistors, for example, 83 and 84, of FIG. 6, have been included in their associated inductors in FIG. 7 for purposes of simplicity. It will also be appreciated that all the elements shown in FIG. 7 rotate with the intermediate housing 63 except the stator of the magnetic slip ring 73 and the stator of the resolver 74. By utilizing this arrangement, conventional slip rings are eliminated thereby eliminating a major source of gyroscopic coersion and undesirable electrical noise. If necessary to avoid high electrostatic potentials in the rotating assembly, grounding other than through the support bearings can be done with button contacts on the ends of the rotating shafts 67 and 68 or some other similar device which will not interfere with the accuracy of the apparatus.

Although the preferred embodiment of the invention has been described with respect to the use of space quadrature pick-offs which is desirable to provide resolution to produce constant outputs and to eliminate false signals resulting from second harmonic angular vibration, it will be appreciated from the above explanation that a single pressure responsive pick-off can be utilized to provide information with respect to two space axes because phase angle is a measure of the direction of the applied rotation vector by revising the associated circuits in a manner obvious to one skilled in the art. Further, more than two pairs of transducers can be used with respect to a particular axis, but this would involve more complicated circuitry without appreciably improving performance.

While the invention has been described with respect to a spherical cavity 12, in practice this has not been found to be critical. Substantially spherical cavities such as prolate and oblate spheroids have been found satisfactory and cavities with pockets therein for the pick-offs are acceptable.

Preferably, the rotor housing 13 is floated in a fluid having the same density as the housing 13 and the diaphragms, for example, 35, to minimize acceleration effects. The rotor fluid must also be a dielectric to be compatible with the pick-offs. A suitable fluid in these regards is Minnesota Mining and Manufacturing Fluorochemical fluid FC75. In lieu of capacitive pick-offs, other types of pick-offs may be utilized, for example, piezoelectrical transducers such as barium titanate transducers may be used.

The symmetrical mounting arrangement and the multiple shell construction reduces drifts resulting from axial temperature gradients to a very low level. In addition, this construction eliminates strains in the housing 13 resulting from external linear accelerations. Such strains have been found to generate pressures indistinguishable from those generated by the normal action of the device.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyroscopic device, a fluid, means for containing said fluid, means for spinning said containing means about an axis thereof thereby also spinning said fluid, and means including pressure responsive apparatus communicating with said fluid for detecting the angular difference between the spin axis of said fluid and the spin axis of said containing means.

2. In a gyroscopic device, a fluid, means for containing said fluid in a substantially spherical cavity, means for spinning said containing means about an axis thereof thereby also spinning said fluid, and means including pressure responsive means mounted exteriorly of said cavity and communicating with said fluid for detecting the angular difference between the spin axis of said fluid and the spin axis of said containing means.

3. In a gyroscopic device, a fluid, means for containing said fluid in a substantially spherical cavity, means for spinning said containing means about an axis thereof thereby also spinning said fluid, and means including pressure responsive means mounted exteriorly of said cavity and communicating with the interior of said cavity for providing a signal representative of the angular difference between the spin axis of said fluid and the spin axis of said containing means.

4. In the gyroscopic device of claim 3 wherein said means including pressure responsive means further includes apertures in said cavity equally displaced from the spin axis of said containing means and communicating with said pressure responsive means.

5. In the gyroscopic device of claim 3 wherein said means including pressure responsive means further includes first and second apertures in said cavity equally displaced from the spin axis of said containing means and communicating with one side of said pressure responsive means and a third aperture in said cavity coincident with the spin axis of said containing means and communicating with the other side of said pressure responsive means.

6. In the gyroscopic device of claim 4 wherein said apertures in said cavity includes a first pair of apertures, each of said apertures of said first pair being displaced 45° on either side of the spin axis of said containing means.

7. In the gyroscopic device of claim 6 wherein said apertures in said cavity further includes a second pair of apertures, each of said apertures of said second pair being displaced 45° on either side of the spin axis of said containing means and in quadrature with respect to said first pair of apertures.

8. In the gyroscopic device of claim 3 wherein said pressure responsive means includes first and second pressure responsive devices, and means for connecting said first and second pressure responsive devices for providing a signal having an amplitude representative of twice the magnitude of the deviation of the spin axis of the fluid with respect to the spin axis of the containing means and a phase representative of the sense of said deviation.

9. In the gyroscopic device of claim 3 wherein said pressure responsive means includes a capacitive pick-off for providing a signal representative of the magnitude and sense of the deviation of the spin axis of the fluid with respect to the spin axis of the containing means.

10. In the gyroscopic device of claim 3 wherein said pressure responsive means includes a capacitive pick-off for providing a signal representative of the magnitude and sense of the deviation of the spin axis of the fluid with respect to the spin axis of the containing means, and tuned circuit means wherein said capacitive pick-off is a portion of said tuned circuit and with the spin axis of the fluid aligned with the spin axis of the containing means the capacitance of said pick-off tunes said circuit to a null condition whereby when said spin axes are not aligned the output of said circuit is a function of a measure representative of the quality of said tuned circuit times said pick-off signal.

11. In the gyroscopic device of claim 3 in which said pressure responsive means includes first and second capacitive pick-offs, first and second tuned circuit means wherein said first and second capacitive pick-offs form a portion of said first and second tuned circuit means respectively in which the capacitance of said pick-offs tunes the respective circuits to a null condition when the spin axis of the fluid is aligned with the spin axis of the containing means, and means including resolving means responsive to said tuned circuit means for providing a signal representative of the magnitude and sense of the deviation of the spin axis of the fluid with respect to the spin axis of the containing means.

12. In a gyroscopic device of claim 10 wherein said capacitive pick-off comprises two plates, one of said plates being fixed with respect to said containing means and permeable to permit fluid flow and the other of said plates being a movable pressure responsive diaphragm and cooperative with said fixed plate, the capacitance of said pick-off being varied in accordance with the pressure applied to said diaphragm.

13. In a gyroscopic device of claim 12 wherein the density of said fluid is substantially equal to the density of said movable diaphragm to prevent deflection of said diaphragm in response to accelerations.

14. In a gyroscopic device, a fluid, means for containing said fluid in a substantially spherical cavity, means for spinning said containing means about an axis thereof thereby also spinning said fluid, and means including pressure responsive means mounted exteriorly of said cavity and communicating with said fluid within said cavity for measuring the magnitude and sense of the deviation between the spin axis of the fluid and the spin axis of the containing means resulting from the precession of the fluid caused by gyroscopic action as the gyroscopic device rotates in space.

15. A symmetrical gyroscopic device comprising a fluid, means for containing said fluid in a substantially spherical cavity, means for spinning said containing means about an axis thereof thereby also spinning said fluid, means for supporting said containing means at the center of support of said fluid, and means including pressure responsive means mounted exteriorly of said cavity and communicating with the interior thereof for providing a signal representative of the magnitude and the sense of the deviation between the spin axis of said fluid and the spin axis of said containing means, said means for containing said fluid, means for spinning said containing means, means for supporting said containing means, and means including pressure responsive means being so constructed and arranged that they are structurally and thermally symmetrical with respect to the center of gravity of said fluid.

16. In the gyroscopic device of claim 15 wherein said means for containing said fluid includes a housing having first and second symmetrical support shafts extending oppositely from the housing and coaxial with the spin axis of said containing means, said means for spinning said containing means including first and second drive motors symmetrically mounted near the outermost extemities of said first and second shafts respectively and coaxial with the spin axis of said containing means, said first and second shafts being journalled in first and second bearings respectively, said bearings being symmetrically disposed with respect to said center of gravity and coaxial with the spin axis of said containing means, said means including pressure responsive means including a magnetic slip ring mounted on said first shaft and a resolver mounted on said second shaft, said magnetic slip ring and said resolver being symmetrical with respect to said center of gravity and coaxial with the spin axis of said containing means, said magnetic slip ring and said resolver being symmetrically mounted near the innermost extremities of said first and second shafts respectively whereby all the aforementioned elements are arranged to be structurally and thermally symmetrical with respect to said center of gravity with the greatest heat producing elements outermost.

17. In the gyroscopic device of claim 16 wherein said means for containing the fluid includes a cavity housing, a first housing, and a second housing, said first housing being intermediate said cavity housing and said second housing in spaced relation one within the other with the space between the cavity housing and the first housing filled with said fluid and the space between said first housing and said second housing filled with a temperature gradient attenuating insulating means.

18. In the gyroscopic device of claim 17 wherein said first housing includes resilient means for compensating for changes in volume of said fluid with changes in temperature.

19. A capacitive pick-off responsive to pressure variations of a fluid comprising first and second plates, said first plate being a diaphragm which deflects in accordance with the pressure variations of said fluid and said second plate being fixedly mounted and cooperative with said first plate, said second plate being permeable to permit said fluid to flow therethrough to permit deflections of said first plate.

References Cited in the file of this patent

UNITED STATES PATENTS

| | | |
|---|---|---|
| 1,841,606 | Kollsman | Jan. 19, 1932 |
| 2,345,071 | Reynst et al. | Mar. 28, 1944 |
| 2,795,957 | Muzzey | June 18, 1957 |
| 2,857,767 | Werndl | Oct. 28, 1958 |